(12) United States Patent
Montero et al.

(10) Patent No.: US 11,068,599 B2
(45) Date of Patent: Jul. 20, 2021

(54) SECURE INITIALIZATION USING EMBEDDED CONTROLLER (EC) ROOT OF TRUST

(71) Applicant: Dell Products, L.P., Round Rock, TX (US)

(72) Inventors: Adolfo S. Montero, Pflugerville, TX (US); Benson Lai, Taipei (TW)

(73) Assignee: Dell Products, L.P., Round Rock, TX (US)

( * ) Notice: Subject to any disclaimer, the term of this patent is extended or adjusted under 35 U.S.C. 154(b) by 169 days.

(21) Appl. No.: 16/225,229

(22) Filed: Dec. 19, 2018

(65) Prior Publication Data

US 2020/0202004 A1 Jun. 25, 2020

(51) Int. Cl.
*G06F 21/57* (2013.01)
*G06F 21/60* (2013.01)
*G06F 21/64* (2013.01)

(52) U.S. Cl.
CPC .......... *G06F 21/575* (2013.01); *G06F 21/572* (2013.01); *G06F 21/602* (2013.01); *G06F 21/64* (2013.01)

(58) Field of Classification Search
None
See application file for complete search history.

(56) References Cited

U.S. PATENT DOCUMENTS

| | | | |
|---|---|---|---|
| 2004/0230818 A1* | 11/2004 | Craft | G06F 21/51 713/193 |
| 2006/0010329 A1* | 1/2006 | Aaron | G06F 21/577 713/194 |
| 2007/0130452 A1* | 6/2007 | Muir | G06F 21/44 713/1 |
| 2014/0344561 A1* | 11/2014 | Sung | G06F 1/3287 713/2 |
| 2015/0324588 A1* | 11/2015 | Locke | G06F 21/562 713/2 |
| 2016/0055113 A1* | 2/2016 | Hodge | G06F 21/575 710/308 |
| 2016/0063255 A1* | 3/2016 | Jeansonne | G06F 21/572 713/2 |
| 2016/0070934 A1* | 3/2016 | Frank | G06F 21/79 711/103 |

(Continued)

*Primary Examiner* — Danny Chan
(74) *Attorney, Agent, or Firm* — Fogarty LLP (57) ABSTRACT

Embodiments support establishing an embedded controller comprised within an Information Handling System (IHS) as a hardware root of trust. With the booting of the IHS paused and based on instructions encoded in a ROM (Read-Only Memory) of the embedded controller, the firmware of the embedded controller is read from a flash memory, such as a SPI Flash, and stored to a RAM (Random Access Memory) of the embedded controller. The firmware is then authenticated based on instructions encoded in the ROM. Based on instructions included in the authenticated firmware, the embedded controller reads SBIOS (Startup Basic Input Output System) instructions from the flash memory and stores them to RAM where they are authenticated based on instructions included in the authenticated embedded controller firmware. If the SBIOS instructions are authenticated, the embedded controller authorizes booting of the IHS to resume using the authenticated SBIOS instructions.

18 Claims, 3 Drawing Sheets

(56) References Cited

U.S. PATENT DOCUMENTS

2017/0180139 A1* 6/2017 Jeansonne .................. H04L 9/14
2019/0073478 A1* 3/2019 Khessib .............. G06F 13/4072
2020/0042710 A1* 2/2020 Liu ......................... G06F 8/654

* cited by examiner

SECURE INITIALIZATION USING EMBEDDED CONTROLLER (EC) ROOT OF TRUST

FIELD

The present disclosure generally relates to Information Handling Systems (IHSs), and, more particularly, to systems and methods for securely initializing and operating IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and components may vary between different applications, IHSs may also vary regarding what information is handled, how the information is handled, how much information is processed, stored, or communicated, and how quickly and efficiently the information may be processed, stored, or communicated. Variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

During initializing an IHS, a hardware root of trust may be established in a hardware component of the IHS by validating the integrity of the firmware utilized by the hardware component. This trusted hardware component may then be utilized as an anchor that may be used to validate the integrity of additional hardware components of the IHS, thus expanding the scope of the trusted hardware of the IHS. Once a requisite hardware root of trust has been established, initialization of the IHS operating system may be initiated. In this manner, the operating system of the IHS may be initialized only after the underlying integrity of the requisite set of hardware components has been confirmed.

SUMMARY

In various embodiments, an Information Handling System (IHS) includes: a flash memory; and an embedded controller coupled to the flash memory, wherein the embedded controller comprises a Read-Only Memory (ROM) and a Random-Access Memory (RAM), and wherein the embedded controller is configured to: read embedded controller firmware from the flash memory to the RAM based on instructions encoded in the ROM; authenticate the embedded controller firmware based on instructions encoded in the ROM; read SBIOS (Startup Basic Input Output System) instructions from the flash memory to the RAM based on instructions included in the authenticated embedded controller firmware; authenticate the SBIOS instructions based on instructions included in the authenticated embedded controller firmware; and authorize booting of the IHS from the authenticated SBIOS instructions.

In additional IHS embodiments, the flash memory comprises a Serial Peripheral Interface (SPI) flash memory device coupled to a chipset of the IHS. In additional IHS embodiments, the instructions encoded in the ROM specify a location of embedded controller firmware in the flash memory. In additional IHS embodiments, the instructions encoded in the ROM comprise a signature corresponding to authentic firmware of the embedded controller. In additional IHS embodiments, the instructions encoded in the ROM comprise instructions for calculating a signature for the embedded controller firmware in the flash memory read from the flash memory. In additional IHS embodiments, the embedded controller firmware read from the flash memory is authenticated based on comparison of the calculated signature and the signature encoded in the ROM. In additional IHS embodiments, the embedded controller firmware comprises instructions for reading the SBIOS instructions from the flash memory in a plurality of blocks corresponding to a size of the RAM. In additional IHS embodiments, the embedded controller firmware comprises instructions for iteratively calculating a signature for the SBIOS instructions in flash memory based on signature calculated for each of the plurality of block of SBIOS instructions read to the RAM.

In various additional embodiments, an embedded controller comprised within an Information Handling System (IHS), wherein the embedded controller is coupled to the flash memory, and wherein the embedded controller comprises a Read-Only Memory (ROM) and a Random-Access Memory (RAM), and wherein the embedded controller is configured to: read embedded controller firmware from the flash memory to the RAM based on instructions encoded in the ROM; authenticate the embedded controller firmware based on instructions encoded in the ROM; read SBIOS (Startup Basic Input Output System) instructions from the flash memory to the RAM based on instructions included in the authenticated embedded controller firmware; authenticate the SBIOS instructions based on instructions included in the authenticated embedded controller firmware; and authorize booting of the IHS from the authenticated SBIOS instructions.

In additional embedded controller embodiments, the flash memory comprises a Serial Peripheral Interface (SPI) flash memory device coupled to a chipset of the IHS. In additional embedded controller embodiments, the instructions encoded in the ROM specify a location of embedded controller firmware in the flash memory. In additional embedded controller embodiments, the instructions encoded in the ROM comprise a signature corresponding to authentic firmware of the embedded controller. In additional embedded controller embodiments, the instructions encoded in the ROM comprise instructions for calculating a signature for the embedded controller firmware read from the flash memory. In additional embedded controller embodiments, the embedded controller firmware read from the flash memory is authenticated based on comparison of the calculated signature and the signature encoded in the ROM. In additional embedded controller embodiments, the embedded controller firmware comprises instructions for reading the SBIOS instructions from the flash memory in a plurality of blocks corresponding to a size of the RAM. In additional embedded controller embodiments, the embedded controller firmware comprises instructions for iteratively calculating a signature for the SBIOS instructions in flash memory based on signature calculated for each of the plurality of block of SBIOS instructions read to the RAM.

In various additional embodiments, a method establishes an embedded controller comprised within an Information Handling System (IHS) as a hardware root of trust, wherein the embedded controller is coupled to the flash memory, and wherein the embedded controller comprises a Read-Only Memory (ROM) and a Random-Access Memory (RAM). The method includes: reading embedded controller firmware from the flash memory to the RAM based on instructions encoded in the ROM; authenticating the embedded controller firmware based on instructions encoded in the ROM; reading SBIOS (Startup Basic Input Output System) instructions from the flash memory to the RAM based on instructions included in the authenticated embedded controller firmware; authenticating the SBIOS instructions based on instructions included in the authenticated embedded controller firmware; and authorizing booting of the IHS from the authenticated SBIOS instructions.

In additional method embodiments, the instructions encoded in the ROM specify a location of embedded controller firmware in the flash memory, and wherein the instructions encoded in the ROM comprise a signature corresponding to authentic firmware of the embedded controller, and wherein the instructions encoded in the ROM comprise instructions for calculating a signature for the embedded controller firmware in the flash memory read from the flash memory. In additional method embodiments, the embedded controller firmware read from the flash memory is authenticated based on comparison of the calculated signature and the signature encoded in the ROM. In additional method embodiments, the embedded controller firmware comprises instructions for reading the SBIOS instructions from the flash memory in a plurality of blocks corresponding to a size of the RAM and wherein the embedded controller firmware comprises instructions for iteratively calculating a signature for the SBIOS instructions in flash memory based on signature calculated for each of the plurality of block of SBIOS instructions read to the RAM.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

In certain instances, a hardware root of trust may be established in the main processor of an IHS. However, if a hardware root of trust is to be established in the IHS main processor, IHS manufacturers must support each different root of trust scheme for all supported processor chipsets. Different chipsets may implement disparate root of trust schemes that utilize very different authentication and failover mechanisms. Supporting a new chipset requires IHS manufacturers to support another root of trust scheme. Embodiments provide support for a hardware root of trust to be established in an embedded controller of the IHS where the embedded controller may serve as a root of trust anchor for a variety of chipsets.

Figure 1:
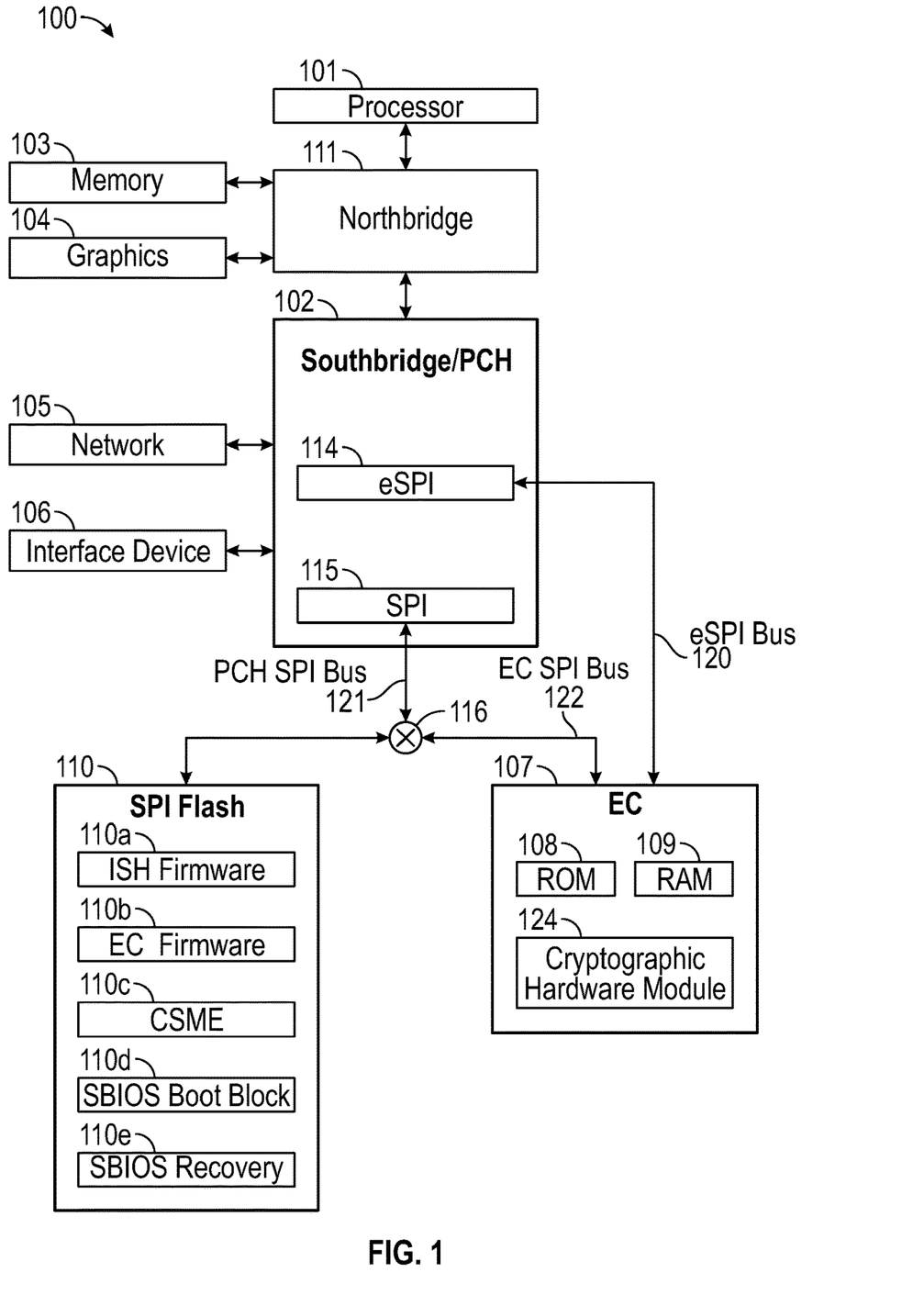
FIG. 1 is a block diagram depicting certain components of an Information Handling System (IHS) configured, according to some embodiments, for establishing a root of trust in an embedded controller of an IHS.

FIG. 1 illustrates an example of components of IHS 100 configured, according to some embodiments, for establishing a hardware root of trust in an embedded controller 107. As illustrated, IHS 100 includes a main processor 101. In various embodiments, IHS 100 may be a single-processor system, or a multi-processor system including two or more processors. Processor 101 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

As illustrated, processor 101 may be accessed via a northbridge 111 chip or integrated circuit that provides an interface to processor 101 that may be accessed by northbridge 111 via a QuickPath Interconnect (QPI) or front side bus. Northbridge 111 also provides access to system memory 103 that may be configured to store program instructions and/or data accessible by processor 101. In various embodiments, system memory 103 may be implemented using any suitable memory technology, such as static RAM (SRAM), dynamic RAM (DRAM) or magnetic disks, or any nonvolatile/Flash-type memory, such as a solid state drive (SSD). As illustrated, northbridge 111 may also provide access to graphics processor 104. In certain embodiments, graphics processor 104 may be part of one or more video or graphics cards installed as components of IHS 100. Graphics processor 104 may be coupled to northbridge 111 via a graphics bus such as provided by an AGP (Accelerated Graphics Port) bus or a PCIe (Peripheral Component Interconnect Express) bus. In certain embodiments, a graphics processor 104 generates display signals and provides them to a monitor or other display device.

IHS 100 includes Platform Controller Hub (PCH) or southbridge chipset 102, which may comprise one or more integrated circuits (ICs) coupled to northbridge 111. In certain embodiments, PCH 102 provides processor 101 with access to a variety of resources. For instance, PCH 102 may be coupled to network interface 105, such as a Network Interface Controller (NIC). In certain embodiments, network interface 105 may be coupled to PCH 102 via a PCIe bus or the like, and it may support communication via various wired and/or wireless networks. User interface device(s) 106 may include a keyboard, trackpad, camera, remote control, or any other device configured to enable a human user to interact with IHS 100.

As illustrated, IHS 100 includes an embedded controller (EC) 107 that may be a microcontroller component installed on the motherboard of the IHS or may be installed on an expansion card that is coupled to the IHS motherboard. As described in additional detail with regard to FIGS. 2 and 3, embedded controller 107 may be configured to authenticate its own firmware instructions using on hard coded instructions in order to establish a hardware root of trust in the embedded controller 107. In certain embodiments, embedded controller 107 may also perform and/or authenticate components that perform various system tasks that are not implemented by the IHS's Operating System (OS), such as receiving and processing signals from attached peripherals, turning the IHS on and off, thermal measurement and cooling, controlling visual indicators utilized by the IHS, battery and power management, and supported remote diagnostics and management of the IHS.

As illustrated, embedded controller 107 may also include a cryptographic hardware module 124. Cryptographic hardware module 124 may implement various cryptographic operations and may be relied on as a trusted authentication resource that is not corruptible without physical access to the module 124. In certain embodiments, cryptographic hardware module 124 may include read-only storage that may be used to record a certain number of cryptographic keys and/or signatures. In some instances, modification of such cryptographic keys and signatures may be extremely difficult without damaging the cryptographic hardware module 124, such keys encoded in the cryptographic hardware via one-time programmable fuses. In various embodiments, cryptographic hardware module 124 may be implemented as an FPGA, or as other hardware logic integrated into embedded controller 107.

As illustrated, embedded controller 107 may include two types of internal memories, a non-volatile (Read-Only Memory) ROM 108 and a volatile (Random-Access Memory) RAM 109. As described in additional detail with regard to FIGS. 2 and 3, the ROM 108 may be programmed with instructions that initiate establishing a hardware root of trust in embedded controller 107. In certain embodiments, the ROM 108 instructions may direct the retrieval and authentication of firmware instructions to be utilized by the embedded controller 107. For instance, the ROM 108 instructions may read firmware instructions from a SPI (Serial Peripheral Interface) Flash 110 memory module of the IHS 100 and transfer the instructions to the RAM 109 for authentication.

In certain embodiments, SPI Flash 110 may be a non-volatile memory device capable of being electrically erased and reprogrammed. SPI Flash 110 may be divided into various partitions 110a-e with each partition storing instructions and/or data for a different component of IHS 100. In the illustrated embodiment, partition 110a may store firmware instructions for use by an Integrated Sensor Hub (ISH) component of IHS 100. Partition 110d may store Converged Security and Management Engine (CSME) firmware for use by processor 101, or a controller operating in support of processor 101, in performing certain security and monitoring operations. As described, embedded controller 107 may rely on firmware that may be stored in a partition 110b of the SPI Flash 110.

Figure 2:
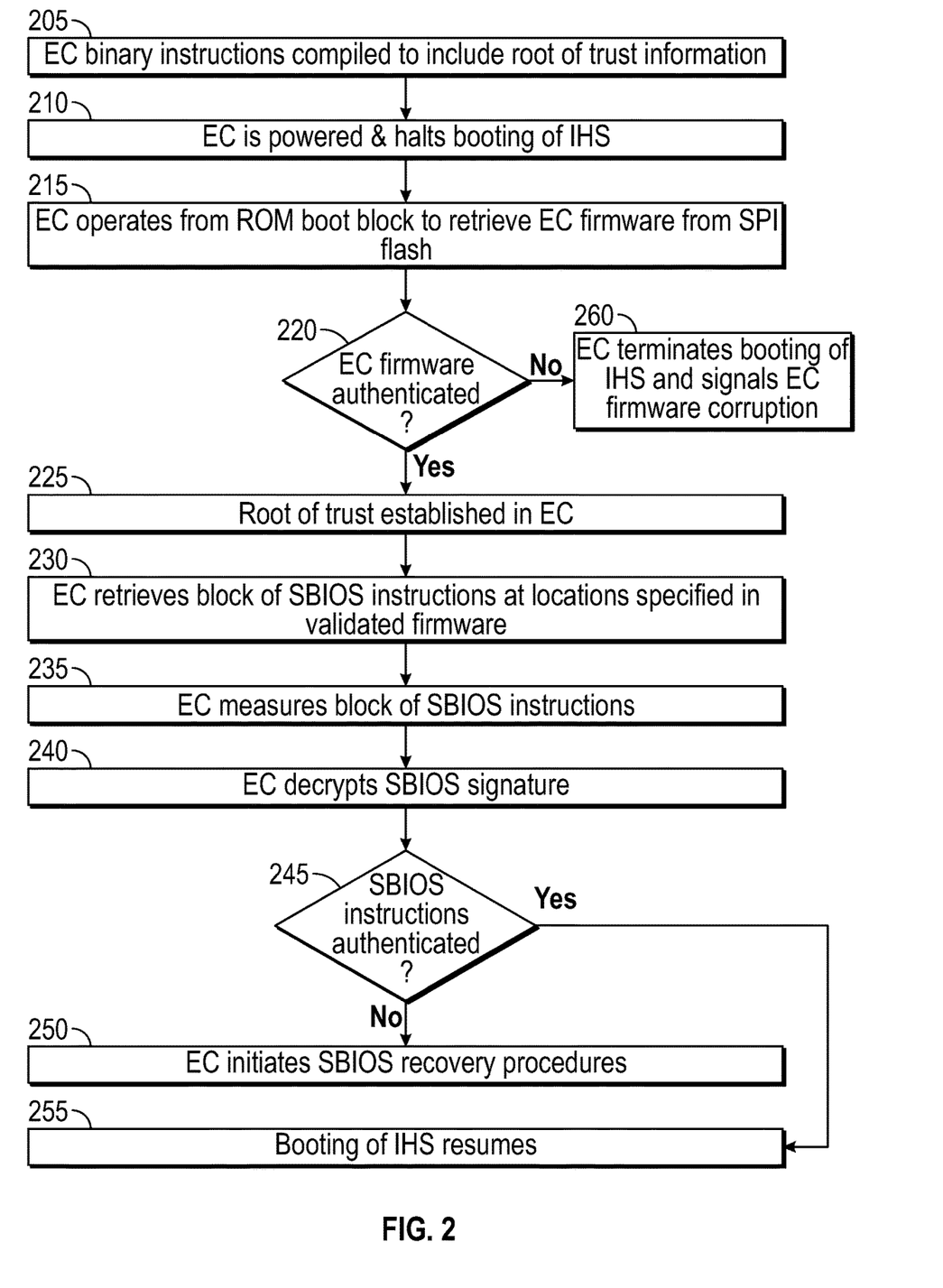
FIG. 2a is flowchart illustrating certain steps of a method according to various embodiments for establishing a root of trust in an embedded controller of an IHS.
Figure 3:
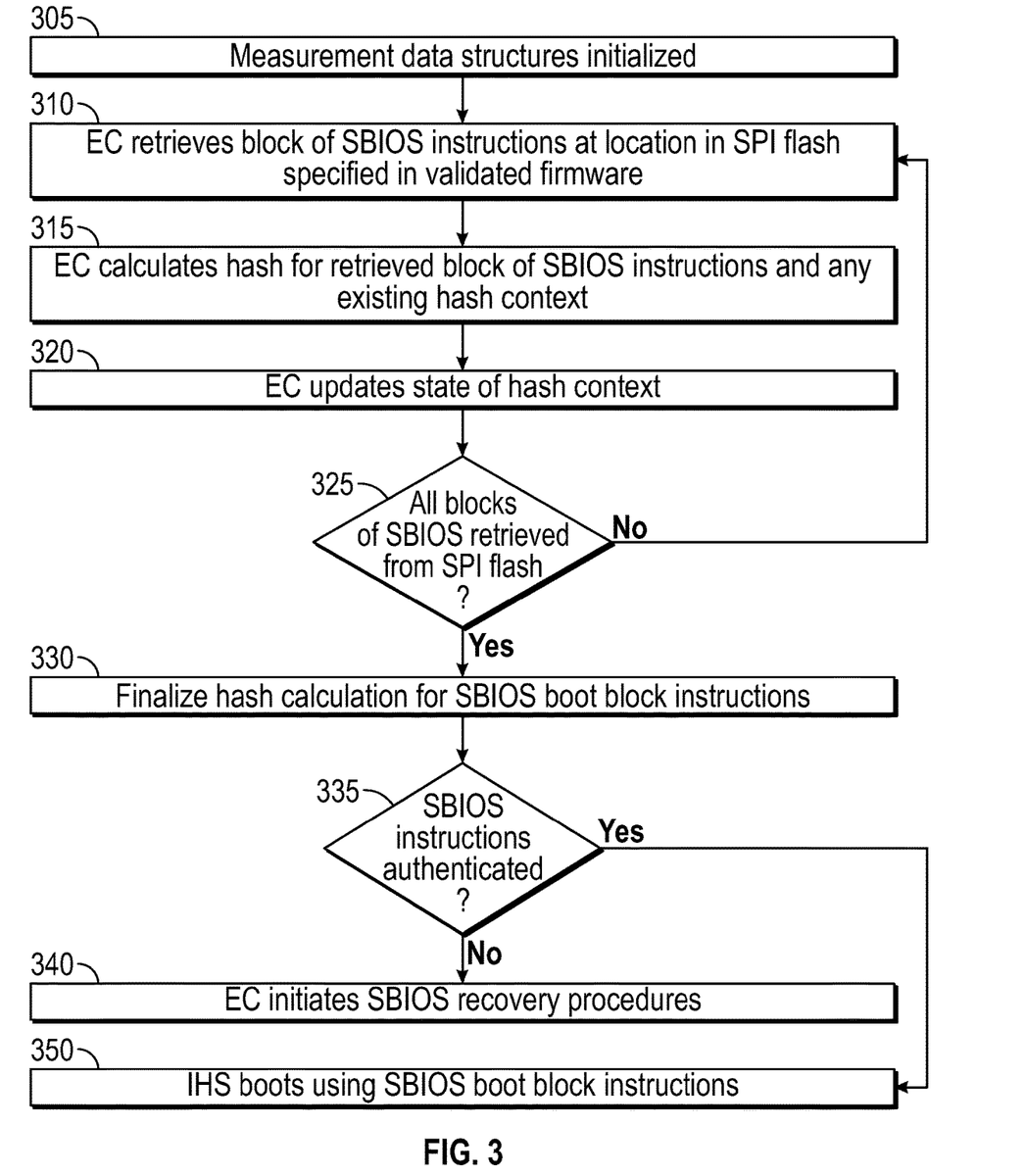
FIG. 3 is a flowchart illustrating certain steps of a method according to various embodiments for measuring a boot block of SBIOS (Startup Basic Input/Output System) instructions based on incremental measurements of portions of the block.

As described in additional detail with regard to FIGS. 2 and 3, embedded controller 107 may also read and authenticate SBIOS (Startup Basic Input/Output System) instructions stored in partition 110d of SPI Flash 110 in order to expand the root of trust to include the SBIOS instructions used to boot IHS 100. Also as described with regard to FIGS. 2 and 3, SPI Flash 110 may also include an SBIOS recovery partition 110e that may be used to store a backup copy of the SBIOS instructions that may be used in scenarios where corruption of the primary SBIOS instructions has been detected by the embedded controller 107.

In the illustrated embodiment, SPI Flash 110 is coupled to an SPI module 115 of PCH 102 over SPI bus 121, thus enabling the PCH 102 access to the contents of the SPI Flash 110. In certain embodiments, SPI Flash 110 may also be coupled to embedded controller 107 via SPI bus 122. In the illustrated embodiment and as described in greater detail in patent application Ser. No. 15/922,694, filed on Mar. 15, 2018 ("the '694 Application") and incorporated by reference herein, access to SPI Flash 110 via the PCH SPI bus 121 and EC SPI bus 122 may be controlled via a hardware multiplexer 116. Rather than utilize a hardware multiplexer, in other embodiments, embedded controller 107 may retain exclusive access to SPI Flash 110 during certain intervals by issuing a reset signal to PCH 102 over eSPI bus 120, thus triggering PCH 102 to deactivate its end of SPI bus 121.

In order to interface with the SPI Flash 110 utilizing the Enhanced Serial Peripheral Interface (eSPI) protocol, embedded controller 107 may be coupled to an eSPI module 114 of PCH 102 over eSPI bus 120. Whereas an SPI interface is limited to support for exchange of data between a master device and a slave device, such as PCH configured as a master device and SPI flash configured as a slave device. Using eSPI, however, a slave device, such as embedded controller 107, may be allowed to use a master device, such as PCH 102, as a proxy that performs eSPI operations on an SPI flash at the request the embedded controller 107 slave device. When accessing SPI flash 110 using eSPI operations, PCH 102 may limit to access to partitions 110a-e via descriptor blocks that are maintained by SPI Flash 110, where the descriptor blocks specify entities that are authorized to access each region of SPI Flash 110.

In various embodiments, IHS 100 may be configured to implement different trust policies for ROM and RAM code that is executed by embedded controller 107. For instance, instructions encoded in ROM 108 of embedded controller 107 may be deemed as inherently trusted since such instructions may be configured during manufacture of IHS 100 and may not be reprogrammed without disabling embedded controller 107, thus indicating an attempt to compromise IHS 100. Conversely, instructions stored RAM 109 of embedded controller 107 may require authentication in order to be deemed as trusted.

In order to secure access SPI flash 110 by embedded controller 107 in a manner that supports establishing a hardware root of trust in embedded controller 107, embodiments may rely on techniques described in the '694 Application. In particular, embedded controller 107 may be limited to accessing SPI flash 110 over SPI bus 122 only while commands stored in ROM portion 108 are being executed by embedded controller 107. When accessed by SPI bus 122 via configuration of multiplexer 116, SPI flash 110 may be configured to bypass the descriptor blocks that normally limit access to individual partitions 110a-e of SPI flash 110.

As described in additional detail with regard to FIGS. 2 and 3, during intervals when operating from ROM 108 instructions, embedded controller 107 reads data stored in SPI flash 110, such as embedded controller firmware 110*b*, and stores those instructions in RAM portion 109 for authentication. However, before embedded controller 107 begins executing or processing the newly fetched commands or instructions now stored in RAM portion 109, the SPI bus 122 between embedded controller 107 and SPI flash 110 may be disabled via reconfiguration of multiplexer 116, or by triggering PCH 102 to maintain SPI bus 121 in a reset state. During such intervals, embedded controller 107 may access SPI flash 110, in a shared manner with other IHS components, via eSPI bus 120 provided by module 114 of PCH 102. By disabling access to the SPI flash 110 prior to execution of still untrusted RAM 109 code, embedded controller 107 prevents malicious code from making modifications and from bypassing protections otherwise imposed by the PCH 102, such as limiting access to partitions 110*a-e* based on descriptor blocks. As set forth in greater detail in the '694 Application, this promotes the ability to establish a hardware root of trust in the embedded controller 107 while limiting the possibility of IHS 100 being compromised during the authentication process used to establish the root of trust.

In various embodiments, IHS 100 may not include each of the components shown. Additionally, or alternatively, IHS 100 may include components other than those that are shown (e.g., additional storage and user interface devices, Super I/O controllers, USB ports, etc.). Furthermore, some of the components that are represented as separate components may, in some implementations, be integrated with other components. In various embodiments, all or a portion of the functionality provided by the illustrated components may instead be provided by components integrated into processor 101 as a system-on-a-chip (SOC) or the like.

FIG. 2 is flowchart illustrating certain steps of a method according to various embodiments for establishing a root of trust in an embedded controller of an IHS. The illustrated embodiment begins at block 205 with the configuration of the embedded controller to operate using firmware instructions that may be used to establish of a root of trust in the embedded controller. In certain embodiments, the embedded controller may be configured at the factory during the manufacture and configuration of the IHS. In such embodiments, the embedded controller firmware may be compiled in binary form and stored to a partition of the SPI Flash, such as described with regard to FIG. 1. As described in additional detail below, the compiled firmware instructions may include instructions and cryptographic signatures that may be used to authenticate the firmware of the embedded controller and the SBIOS boot block instructions from which the IHS will be booted. In certain embodiments, certain of such cryptographic information may be encoded within a cryptographic hardware module of the embedded controller, such as described with regard to FIG. 1.

After manufacture of the IHS is complete and the embedded controller instructions have been compiled and stored as described, at block 210, the IHS, and by consequence the embedded controller, may be powered. Upon being powered, the embedded controller may be configured to pause further booting of the IHS. In particular, any loading or executing of the SBIOS and operating system instructions of the IHS may be paused by the embedded controller until a root of trust has been established in the embedded controller. With booting of the IHS paused, the embedded controller continues by initiating operations to establish the root of trust in the embedded controller.

At block 215, the embedded controller boots from its own ROM-based boot block, such as from ROM 108 of FIG. 1.

In certain embodiments, the ROM of the embedded controller is configured with instructions that upon execution, cause the embedded controller to access the portion of the SPI flash containing the embedded controller's firmware instructions, such as a binary file including compiled firmware instructions. The ROM of the embedded controller may thus be encoded with instructions for accessing the correct partition of the SPI flash and downloading the binary file including the firmware instructions to the RAM of the embedded controller.

In certain embodiments, the ROM boot block of the embedded controller may also be encoded with instructions by which the firmware binary file retrieved from the SPI flash may be measured, at block 220, in order to validate the integrity of the firmware instructions to be used by the embedded controller. In certain embodiments, the ROM instructions may be operable to implement a hash function that may be used to calculate a hash value based on the retrieved firmware binary file. In such embodiments, the integrity of the of the firmware binary file may be confirmed if a firmware signature encoded within the ROM of the embedded controller can be successfully decrypted and the calculated hash value matches the decrypted firmware signature. In this manner, the embedded controller may be configured to operate using only firmware that can be confirmed as authentic based on encoded ROM instructions configured during the manufacture of the IHS.

If the calculated hash value does not match the firmware signature encoded in the ROM boot block of the embedded controller, at block 260, the embedded controller may signal an error condition indicating the embedded controller firmware stored in the SPI flash has been corrupted, or the firmware is otherwise unrecognized by the embedded controller. In scenarios where the firmware measurements conducted by the embedded controller generate a hash value matching the firmware signature encoded in the ROM boot block, at block 225, a root of trust has been established in the embedded controller since it will operate using firmware instructions that have been authenticated as matching an immutable signature that is encoded within the ROM of the embedded controller.

With the root of trust established in the embedded controller, at block 230, the SBIOS boot block instructions for initializing the IHS may be similarly retrieved from a partition of the SPI flash and validated. In certain embodiments, the binary firmware instructions loaded from the SPI flash and validated by the embedded controller may include instructions that specify the location and size of the SBIOS partition in the SPI flash. The binary firmware instructions of the embedded controller may also include a signature corresponding to the SBIOS boot block instructions. Certain embodiments may specify the location of a SBIOS boot block signature, such as at a location within the compiled SBIOS boot block instructions stored within the SBOS partition of the SPI flash. Embodiments thus provide an alternative to including the SBIOS boot block signature within the SPI flash, such as within a header of the SBIOS boot block partition, and thus provides increased assurances of the integrity of the SBIOS boot block instructions.

In certain embodiments, the binary firmware instructions of the embedded controller may also specify pointers to blocks of SBIOS instructions stored within the SPI Flash. Such pointers may be selected, in certain embodiments, to partition the SBIOS instructions into blocks corresponding to the size of the RAM buffers utilized to transfer the SBIOS instructions to the embedded controller for authentication. In certain embodiments, the embedded controller may use ROM instructions for accessing SPI Flash via read operations, but may disable further access to SPI Flash upon establishing the embedded controller as the root of trust and authenticating the SBIOS boot block instructions by which the IHS will continue initialization.

In certain embodiments, the SBIOS boot block instructions may be authenticated through incremental calculation of a hash value. As described in additional detail with regard to FIG. 3, a hash value may be generated for each block of SBIOS instructions retrieved from SPI Flash and buffered by the embedded controller. Upon retrieving the next block of SBIOS instructions, the hash value is updated based on the hash value calculated based on this next block and the hash value calculated for the prior blocks retrieved from SPI Flash.

Upon reading all of the blocks of SBIOS instructions from the SPI Flash, at block 235, the embedded controller may decrypt the signature that will be used to authenticate the SBIOS instructions based on the final hash value calculated based on each of the blocks of SBIOS instructions. In certain embodiments, the signature for the SBIOS may be included within the compiled binary firmware instructions of the embedded controller that were authenticated at block 220. The embedded controller may utilize a public key corresponding to the private key of the entity providing the embedded controller firmware in order to decrypt the signature of the SBIOS instructions. As described with regard to FIG. 1, the embedded controller may utilize a cryptographic hardware to calculate the hash value of the SBIOS instructions and to decrypt the provide signature for the SBIOS instructions. At block 245, the hash value is compared against the decrypted signature in order to determine if the SBIOS instructions in the SPI Flash are authentic.

If the SBIOS instructions are authenticated, at block 255, the IHS is allowed to resume booting using the authenticated SBIOS boot block instructions. The chain of trust process may allow the root of trust to now transfer to the SBIOS, now operating based on the authenticated SBIOS boot block instructions. Now operating as the root of trust, the SBIOS may be configured to similarly validate additional firmware instructions utilized by the IHS and thus expand the scope of the root of trust born from the root of trust anchor established by the embedded controller. Once a requisite set of components have been validated, the SBIOS completes booting of the operating system of the IHS.

In scenarios where the SBIOS instructions are not successfully authenticated, the corruption of the SBIOS instructions is indicated. In some conventional scenarios, booting of the IHS cannot proceed any further without validated SBIOS boot block instructions. Such scenarios may be encountered in IHS configured to establish a hardware root of trust in the main processor of the IHS. If the root of trust cannot be successfully established in the main processor, in many cases, the IHS cannot be further initialized in a trusted manner. This may render the IHS inoperable as many IHSs do not include any procedures for recovery of a valid SBIOS image. In certain instances, the inability to validate the SBIOS boot block may result in a timed period of inoperability, such as thirty minutes, during which the IHS will not boot.

In scenarios where the SBIOS boot block cannot be validated, certain embedded controller embodiments may support attempts to recover a valid SBIOS boot block image to replace the corrupted SBIOS image identified in the SPI flash. In certain embodiments, the binary firmware instructions of the embedded controller may be configured with instructions for retrieving a SBIOS image from a hidden and protected section of the SPI Flash. This SBIOS image may be encrypted in order to preventing malicious actors from identifying the hidden SBIOS image as a copy of the primary SBIOS boot block in SPI Flash. In such embodiments, the embedded controller may include instructions for decrypting and verifying the integrity of the backup SBIOS boot block image. Other embodiments may retrieve a backup SBMOS image from a backup SPI Flash. Other embodiments may retrieve a backup SBIOS boot block stored within the portion of the SPI Flash allocated for storage of the embedded controller binary firmware instructions. Other embodiments may retrieve a backup SBIOS boot block from a network location, either via a network stack implemented by the embedded controller or via a network controller of the IHS. Once the backup SBIOS boot block has been retrieved and used to replace the corrupted SBIOS in the SPI Flash, the described procedures may be utilized in order to confirm the integrity of the backup SBIOS boot block.

FIG. 3 is flowchart illustrating certain steps of a method according to various embodiments for measuring a boot block of SBIOS instructions based on incremental measurements of portions of the block. For instance, as described with regard to FIG. 2, SBIOS boot instructions may be retrieved from SPI Flash in blocks that are buffered in the RAM of the embedded controller in order for the SBIOS boot instructions to be authenticated. As described with regard to FIG. 1, the embedded controller may utilize a cryptographic hardware system that provides the ability to quickly calculate hash functions, thus supporting the embedded controller's ability to serve as a root of trust while validating the integrity of a firmware instruction for use by the embedded controller and for booting the IHS.

As described with regard to blocks 230 and 235 of FIG. 2, once the embedded controller has been established as a hardware root of trust, the embedded controller may initiate validation of the SBIOS boot block instructions stored within a partition of the SPI Flash. The embodiment of FIG. 3 begins at block 305 with the embedded controller initializing data structures and allocating RAM for use in downloading blocks of SBIOS instructions from the SPI Flash and sequentially calculating a signature for the complete SBIOS boot instructions based on the sequential calculations on individual blocks. In certain embodiments, the embedded controller may initialize a hash state data structure for maintaining the current hash context based on the blocks of SBIOS instructions that have been retrieved, buffered and measured using a hash function.

At block 305, the embedded controller retrieves a block of SBIOS boot instructions from the SPI Flash and stores it to a RAM buffer of the embedded controller. As described with regard to FIG. 2, the compiled firmware instructions of the embedded controller may include pointers that define blocks of SBIOS boot instructions within the SPI Flash. As described with regard to FIG. 1, the embedded controller may configure a hardware multiplexer or may trigger a SPI bus reset condition to allow exclusive access to SPI Flash during intervals when the individual blocks of SBIOS boot instructions are downloaded to the RAM buffer of the embedded controller. Upon completion of the buffering and establishing the embedded controller as the root of trust, the embedded controller may disable further access to the SPI Flash via the hardware multiplexer or an SPI bus reset condition, as set forth in greater detail in the '694 Application.

Once further access to the SPI Flash has been disabled, at block 310, the embedded controller measures the block of SBIOS boot instructions that has been stored to the RAM buffer. As described, the embedded controller may rely on a cryptographic hardware module that implements a hash function that may be used to calculate a hash value based on the contents of the RAM buffer. When the block being measured is not the initial block of SBIOS instructions, the hash function generates a hash value based both on hash calculation based on the currently buffered block of SBIOS instruction and also based the hash value calculated during evaluation of the prior block of SBIOS instructions.

In this manner, the signature for the SBIOS boot instructions may be calculated based on incremental processing of blocks of SBIOS boot instructions. In support of this capability, at block 320, the embedded controller updates an incremental hash value context to reflect the current hash value based on the blocks of SBIOS boot instructions that have been processed so far. If, at block 325, any blocks of SBIOS boot instructions remain to be read from the SPI Flash SBIOS partition, the embedded controller repeats the process, at block 310, of reading the next block of SBIOS boot instructions from the SPI Flash and the incremental calculation of a SBIOS boot block signature continues.

If the embedded controller determines, at block 325, that all blocks of the SBIOS boot instruction have been read and process, at block 330, the embedded controller finalizes the signature calculation for the SBIOS boot instructions. In certain instances, the embedded controller may pad any final, partial block of SBIOS instructions in order to maintain consistent utilization of the same hash function already being used. At block 335 and as described with regard to FIG. 2, the SBIOS boot instructions may be authenticated based on the finalized hash value signature generated by the embedded controller in comparison to a reference signature for the SBIOS boot block. Also as described with regard to FIG. 2, if the SBIOS boot instructions are not successfully authenticated, at block 340, SBIOS recovery procedures may be initiated. If the SBIOS boot instructions are verified as authentic, at block 345, the embedded controller may enable booting of the IHS based on the validated SBIOS boot instructions.

Configured in this manner, the embedded controller may authenticate large SBIOS boot instruction binary files while only utilizing a modest amount of RAM for buffering blocks of the SBIOS instructions. This allows limited embedded controller RAM availability to be utilized in expanding the scope of trust to components, such as the SBIOS, that include large sets of instructions that must be authenticated. In certain embodiments, large SBIOS images may be validated using as little as 64 bytes of embedded controller RAM. Other embodiments may utilize RAM buffers in the range of 4-8 kilobytes in size. In certain embodiments, the size of the RAM buffer and the size of the blocks may be configured according to the available eSPI bandwidth used to read the blocks from the SPI Flash.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a flash memory; and
an embedded controller coupled to the flash memory, wherein the embedded controller comprises a Read-Only Memory (ROM) and a Random-Access Memory (RAM), and wherein the embedded controller is configured to:
read embedded controller firmware from the flash memory to the RAM based on instructions encoded in the ROM, wherein the embedded controller firmware is read from the flash memory via a first bus between the flash memory and the embedded controller;
authenticate the embedded controller firmware based on instructions encoded in the ROM;
read SBIOS (Startup Basic Input Output System) instructions via the first bus from the flash memory to the RAM based on instructions included in the authenticated embedded controller firmware;
prior to executing the SBIOS instructions in the RAM, disable the first bus between the flash memory and embedded controller;
while the first bus remains disabled, authenticate the SBIOS instructions based on instructions included in the authenticated embedded controller firmware in the RAM; and
authorize booting of the IHS from the authenticated SBIOS instructions, wherein the first bus between the embedded controller and the flash memory remains disabled during booting of the IHS from the authenticated SBIOS instructions.

2. The IHS of claim 1, wherein the flash memory comprises a Serial Peripheral Interface (SPI) flash memory device coupled to a chipset of the IHS.

3. The IHS of claim 1, wherein the instructions encoded in the ROM specify a location of embedded controller firmware in the flash memory.

4. The IHS of claim 1, wherein the instructions encoded in the ROM comprise a signature corresponding to authentic firmware of the embedded controller, and wherein the instructions encoded in the ROM comprise instructions for calculating a signature for the embedded controller firmware read from the flash memory, and wherein the embedded controller firmware read from the flash memory is authenticated based on comparison of the calculated signature and the signature encoded in the ROM.

5. The IHS of claim 1, wherein the first bus between the embedded controller and the flash memory remains disabled while the embedded controller instructions that are not encoded in the ROM.

6. The IHS of claim 1, wherein the embedded controller firmware comprises instructions for reading the SBIOS instructions from the flash memory in a plurality of blocks corresponding to a size of the RAM.

7. The IHS of claim 6, wherein the embedded controller firmware comprises instructions for iteratively calculating a signature for the SBIOS instructions in flash memory based on signature calculated for each of the plurality of block of SBIOS instructions read to the RAM.

8. An embedded controller comprised within an Information Handling System (IHS), wherein the embedded controller is coupled to the flash memory, and wherein the embedded controller comprises a Read-Only Memory (ROM) and a Random-Access Memory (RAM), and wherein the embedded controller is configured to:
   read embedded controller firmware from the flash memory to the RAM based on instructions encoded in the ROM, wherein the embedded controller firmware is read from the flash memory via a first bus between the flash memory and the embedded controller;
   authenticate the embedded controller firmware based on instructions encoded in the ROM;
   read SBIOS (Startup Basic Input Output System) instructions via the first bus from the flash memory to the RAM based on instructions included in the authenticated embedded controller firmware;
   prior to executing the SBIOS instructions in the RAM, disable the first bus between the flash memory and embedded controller;
   while the first bus remains disabled, authenticate the SBIOS instructions based on instructions included in the authenticated embedded controller firmware; and
   authorize booting of the IHS from the authenticated SBIOS instructions, wherein the first bus between the embedded controller and the flash memory remains disabled during booting of the IHS from the authenticated SBIOS instructions.

9. The embedded controller of claim 8, wherein the flash memory comprises a Serial Peripheral Interface (SPI) flash memory device coupled to a chipset of the IHS.

10. The embedded controller of claim 8, wherein the instructions encoded in the ROM specify a location of embedded controller firmware in the flash memory.

11. The embedded controller of claim 8, wherein the instructions encoded in the ROM comprise a signature corresponding to authentic firmware of the embedded controller, and wherein the instructions encoded in the ROM comprise instructions for calculating a signature for the embedded controller firmware read from the flash memory, wherein the embedded controller firmware read from the flash memory is authenticated based on comparison of the calculated signature and the signature encoded in the ROM.

12. The embedded controller of claim 8, wherein the first bus between the embedded controller and the flash memory remains disabled while the embedded controller executes instructions that are not encoded in the ROM.

13. The embedded controller of claim 8, wherein the embedded controller firmware comprises instructions for reading the SBIOS instructions from the flash memory in a plurality of blocks corresponding to a size of the RAM.

14. The embedded controller of claim 13, wherein the embedded controller firmware comprises instructions for iteratively calculating a signature for the SBIOS instructions in flash memory based on signature calculated for each of the plurality of block of SBIOS instructions read to the RAM.

15. A method for establishing an embedded controller comprised within an Information Handling System (IHS) as a hardware root of trust, wherein the embedded controller is coupled to the flash memory, and wherein the embedded controller comprises a Read-Only Memory (ROM) and a Random-Access Memory (RAM), the method comprising:
   reading embedded controller firmware from the flash memory to the RAM based on instructions encoded in the ROM, wherein the embedded controller firmware is read from the flash memory via a first bus between the flash memory and the embedded controller;
   authenticating the embedded controller firmware based on instructions encoded in the ROM;
   reading SBIOS (Startup Basic Input Output System) instructions via the first bus from the flash memory to the RAM based on instructions included in the authenticated embedded controller firmware;
   prior to executing the SBIOS instructions in the RAM, disabling the first bus between the flash memory and embedded controller;
   while the first bus remains disabled, authenticating the SBIOS instructions based on instructions included in the authenticated embedded controller firmware; and
   authorizing booting of the IHS from the authenticated SBIOS instructions, wherein the first bus between the embedded controller and the flash memory remains disabled during booting of the IHS from the authenticated SBIOS instructions.

16. The method of claim 15, wherein the instructions encoded in the ROM specify a location of embedded controller firmware in the flash memory, and wherein the instructions encoded in the ROM comprise a signature corresponding to authentic firmware of the embedded controller, and wherein the instructions encoded in the ROM comprise instructions for calculating a signature for the embedded controller firmware read from the flash memory.

17. The method of claim 15, wherein the first bus between the embedded controller and the flash memory remains disabled while the embedded controller executions executes instructions that are not encoded in the ROM.

18. The method of claim 15, wherein the embedded controller firmware comprises instructions for reading the SBIOS instructions from the flash memory in a plurality of blocks corresponding to a size of the RAM and wherein the embedded controller firmware comprises instructions for iteratively calculating a signature for the SBIOS instructions in flash memory based on signature calculated for each of the plurality of block of SBIOS instructions read to the RAM.

* * * * *

UNITED STATES PATENT AND TRADEMARK OFFICE
CERTIFICATE OF CORRECTION

Page 1 of 1

PATENT NO. : 11,068,599 B2
APPLICATION NO. : 16/225229
DATED : July 20, 2021
INVENTOR(S) : Montero et al.

It is certified that error appears in the above-identified patent and that said Letters Patent is hereby corrected as shown below:

In the Claims

In Column 14, Line 55, Claim 17, delete "controller executions executes" and insert -- controller executes -- therefor.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*